Figure 1:
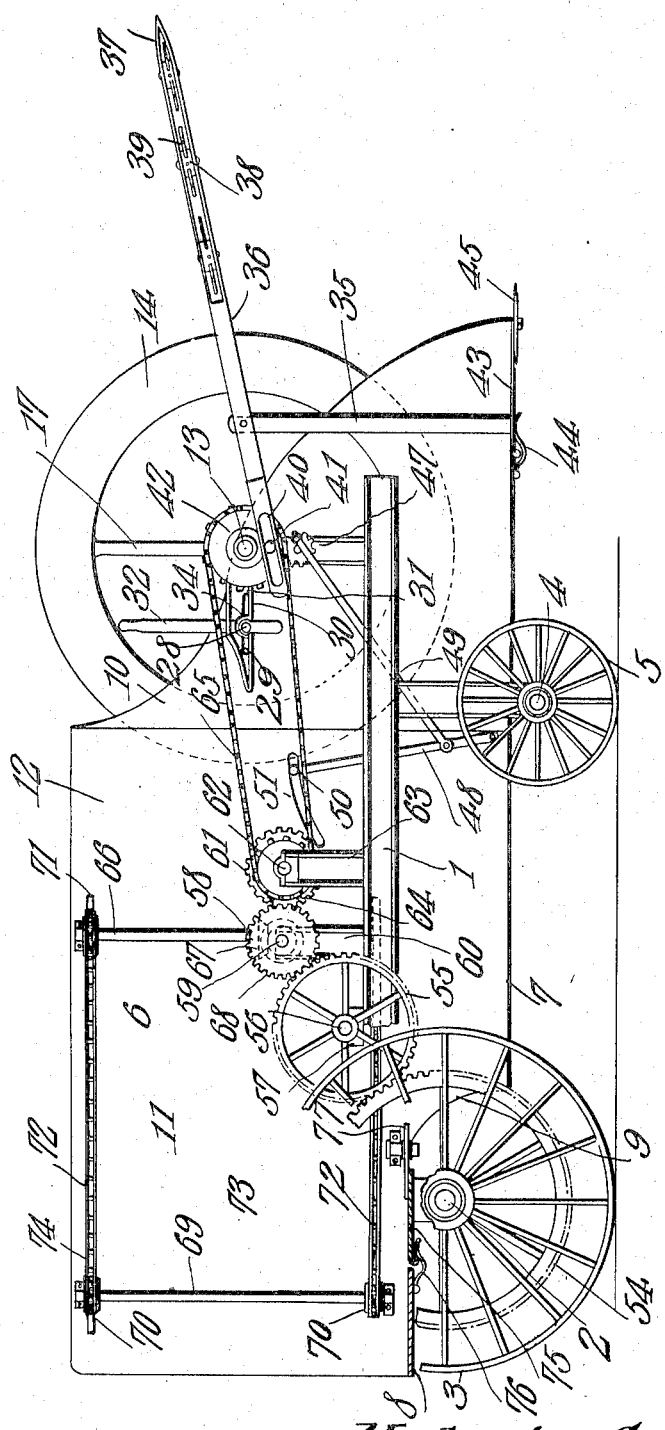

M. C. MOLLERE.
CANE HARVESTER.
APPLICATION FILED NOV. 28, 1908.

976,823.

Patented Nov. 22, 1910.
3 SHEETS—SHEET 1.

Witnesses

Inventor
Mederic C. Mollere.
By C. A. Snow & Co.
Attorneys

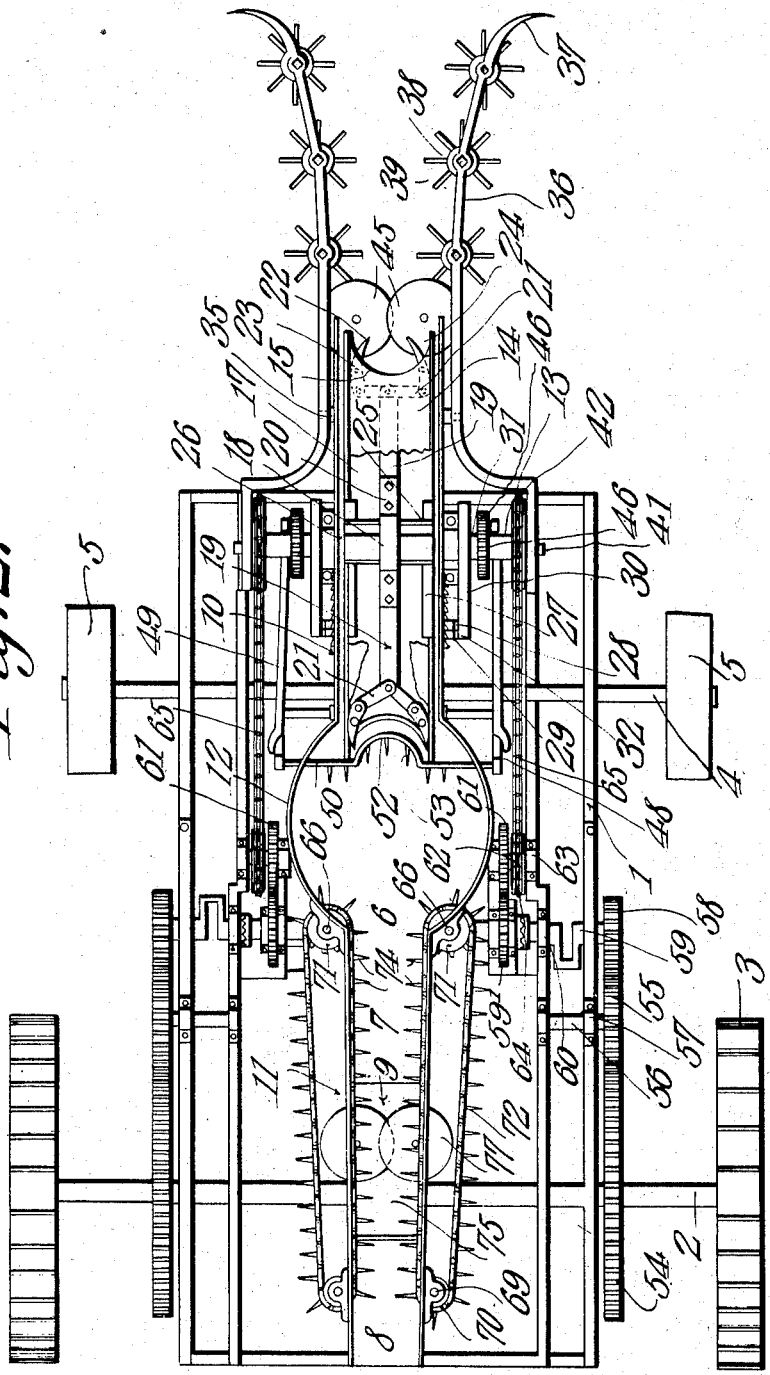

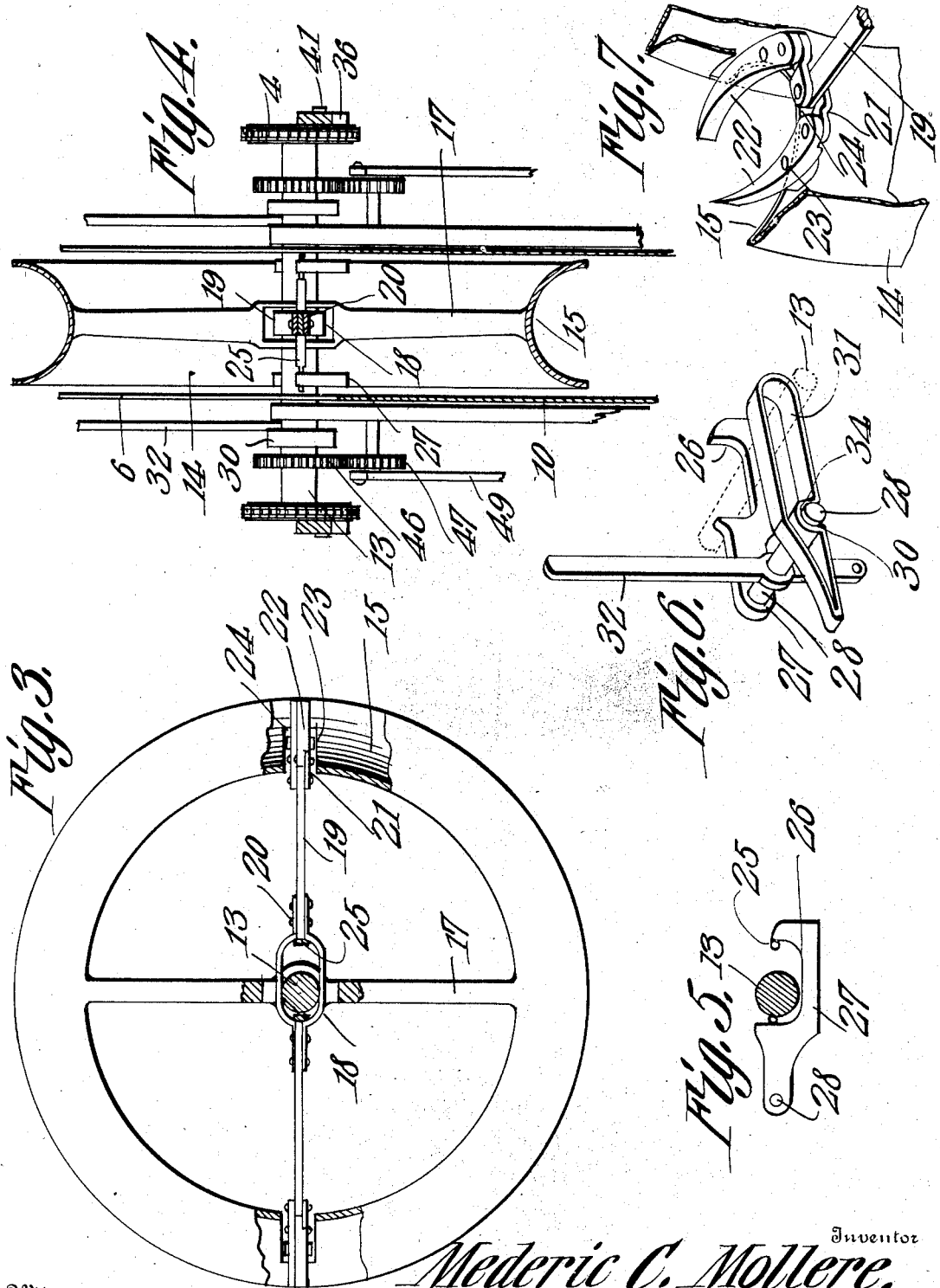

UNITED STATES PATENT OFFICE.

MEDERIC C. MOLLERE, OF CUT OFF, LOUISIANA, ASSIGNOR OF ONE-HALF TO FRANCIS I. CRETINI, OF CUT OFF, LOUISIANA.

CANE-HARVESTER.

976,823.  Specification of Letters Patent.  Patented Nov. 22, 1910.

Application filed November 28, 1908. Serial No. 464,894.

*To all whom it may concern:*

Be it known that I, MEDERIC C. MOLLERE, a citizen of the United States, residing at Cut Off, in the parish of Lafourche and State of Louisiana, have invented a new and useful Cane-Harvester, of which the following is a specification.

This invention has relation to cane harvesters, and it consists in the novel construction and arrangement of its parts as hereinafter shown and described.

The object of the invention is to provide a harvester which is adapted to straighten the stalks prior to severing the same, and to provide means for conveying the stalks in relatively small bundles rearwardly, and, at the same time, inverting them from an upright position into a downwardly disposed position, whereby the said stalks may be shorn or relieved of their tops. The machine is provided with an exit through which the said tops may pass, and it is also provided with means for ejecting the stalks after they have been relieved of the tops and superfluous foliage.

In the accompanying drawings:—Figure 1 is a side elevation of the cane harvester: Fig. 2 is a top plan view of the same: Fig. 3 is a side elevation of a stalk-conveying drum used in the harvester, shown with parts in section: Fig. 4 is a transverse sectional view of the said drum with adjacent parts: Fig. 5 is a detailed side elevation of a cam mechanism for actuating the grippers of the said stalk-conveying drum. Fig. 6 is a perspective view of the same. Fig. 7 is a perspective view of stalk grippers used in the harvester.

The cane harvester consists of the frame 1, which is mounted at its rear portion upon the axle 2, which, in turn, is supported by the traction wheels 3. The forward portion of the frame 1 is mounted upon the axle 4, which is supported by the ground wheels 5. The body or stalk passage 6 is mounted upon the frame 1 and the supporting axles 2 and 4. The said stalk passage 6 is provided with the forward bottom portion 7 and the rear bottom portion 8. The bottom portion 8 is located at a higher elevation than the portion 7. An opening 9 is provided between the bottom portions 7 and 8. The forward and rear portions 10 and 11 of the stalk passage 6 are provided with substantially parallel sides, while the intermediate portion 12 of the said stalk passage 6 is provided with laterally bowed sides, as illustrated in Fig. 2 of the drawings. The portion 12 of the stalk passage 6 is located over the portion 7 of the bottom of the said passage.

The shaft 13 is journaled upon the frame 1 and lies transversely across the forward portion 10 of the stalk passage 6. The stalk-conveying drum 14 is mounted upon the intermediate portion of the said shaft 13 and lies between the side walls of the portion 10 of the stalk passage 6. The upper forward portion of the said drum 14 projects beyond the upper edge of the portion 10 of the passage 6, and the said drum is provided with a concaved annular periphery 15. The peripheral portion 15 of the drum 14 is supported by the spokes 17, which are attached at their inner ends directly to the shaft 13. The elongated band 18 surrounds the middle portion of the shaft 13 and its interior diameter is greater than the diameter of the said shaft 13. The arms 19 are attached to the lugs 20 at the ends of the band 18 and the outer ends of the arms 19 are pivotally connected with the toggle links 21. The outer ends of the toggle links are pivotally connected with the grippers 22 which, in turn, are mounted upon the pivots 23 carried by the peripheral portion 15 of the drum 14. The grippers 22 project through openings 24, provided in the peripheral portion 15 of the drum 14.

The laterally disposed bars 25 are carried by the end portion of the band 18 and the end portions of the said bars are adapted to operate in the elongated recesses 26 of the cam blocks 27. The said blocks 27 are slidably mounted adjacent the inner sides of the walls of the portion 10 of the stalk passage 6, and are fixed to pins 28, which project through elongated perforations 29 provided in the said sides of the said portion 10 of the said stalk passage. The arms 30 are fixed to the outer ends of the pins 28 and are provided with elongated openings 31, which receive the shaft 13. The levers 32 are fulcrumed upon the outer sides of the portion 10 of the stalk passage 6 and are attached to the pins 28, which lie in the recesses 34 provided in the said arms 30, and which are longitudinally alined with the pins 28. The openings 31 in the arms 30 are of greater diameter than the diameter of the shaft 13.

Inasmuch as the pins 28 rigidly connect the arms 30 and blocks 27 together it will be seen that when the said pins are moved by swinging the levers 32 that the blocks 27 will be moved with relation to the shaft 13 while the said shaft 13 passing through the openings 31 of the arms 30 will serve as a guide for the said arms and through the connecting part for the blocks 27. In view of the fact that the recesses 26 are elongated and have their long dimensions horizontally disposed with relation to the axis of the shaft 13 as the blocks 27 are moved as above indicated either the forward or rear ends of the recesses 26 are brought toward the axis of the shaft 13 according to the direction in which the levers 32 are moved. The band 18 attached to the inner ends of the arms 19 rotate with the said arms about the axis of the shaft 13 as the drum 14 rotates and inasmuch as the rods 25 carried by the band 18 engage the edges of the recesses 26 the said rods are caused to describe orbits and consequently the arms 19 are moved longitudinally as the drum 14 rotates and the longitudinal movement of the arms 19 with relation to the axis of the shaft 13 is governed by the relative positions of the ends of the recesses 26 with relation to the axis of the said shaft 13. The rods 25 are held in contact with the edges of the recesses 26 by gravity and therefore it is not necessary to provide guides or other means above the outlets of the recesses 26 for the rods 25. By such movement imparted to the rods 25 it will be seen that the arms 19 in their longitudinal movement will actuate the toggle links 21 whereby the grippers 22 will be swung upon the pivots 23. Also by adjusting the blocks 27, the grippers 22 of each set may be caused to swing toward each other at greater or less degrees according to the amount of material that they are to operate upon. At the forward side of the drum 14 the said grippers will be brought together at their outer ends whereby the stalks (which are cut as hereinafter described) are clutched by the grippers 22 and, as the said grippers pass around to the rear portion of the said drum, they are opened (by the longitudinal movement of the arms 19 as heretofore described) whereby the stalks are liberated.

The standards 35 are mounted at the forward portion of the machine and the arms 36 are pivoted to the upper ends of the said standards. The forward portions of the arms 26 lie in advance of the forward edge of the portion 10 of the stalk passage 6, and are laterally flared away from each other as at 37. The wheels 38 are loosely journaled in the said arms 36 and are provided with the radially disposed pins or spokes 39. The inner or rear ends of the arms 36 are provided with elongated slots 40, which receive the pins 41, which, in turn, are mounted upon the outer sides of the sprocket wheels 42, located upon the shaft 13. It is obvious that when the said shaft 13 rotates and the wheels 42 turn with the same, that the pins 41 carried by the said wheels and operating in the elongated slots 40 of the arms 36 will rock the said arms upon their pivotal connections with the standards 35, and cause their forward ends to reciprocate vertically. This movement on the part of the forward portions of the said arms has a tendency to straighten up the stalks while the spokes 39 of the wheels 38 will engage the foliage carried by the stalks and straighten the same out in vertical lines.

The plate 43 is hingedly mounted below the forward portions of the sides of the end portion 10 of the stalk passage 6, and is held in a substantially horizontal position and in alinement with the bottom portion 7 of the said stalk passage by means of a spring 44, which is attached at one end to the said bottom portion 7, and bears at its other end portion against the plate 43. The cutting disks 45 overlap each other and are loosely mounted at the forward end portion of the said plate 43 and the forward portions of the peripheries of the said disks 45 project beyond the forward edge of the said plate 43.

The pinions 46 are mounted upon the shaft 13 and mesh with the pinions 47, which are suitably journaled upon stub shafts located below the said shaft 13. The arms 48 are pivotally attached at their lower ends to the sides of the stalk passage 6, and the pitman rods 49 are pivotally connected at their lower rear ends with the said arms 48, and at their upper forward ends are pivotally connected with eccentric pins mounted upon the pinions 47. The cross bar 50 is carried by the upper ends of the arms 48 and passes transversely through elongated slots 51 provided in the sides of the portion 12 of the stalk passage 6. The said bar 50 is provided at its middle with an arcuate portion 52, which conforms substantially to the concavity of the peripheral portion 15 of the drum 14. The impaling fingers or tines 53 are mounted upon the intermediate portion of the cross bar 51 and are located within the laterally bowed sides of the portion 12 of the stalk passage 6.

It will be seen that, as the shaft 13 and the pinions 46 mounted thereon rotate, rotary movement is transmitted to the pinion 47 which, in turn, will reciprocate the pitman 49 and the arms 48 will be swung upon their pivots, whereby the cross bar 51, carried at the upper ends of the said arms will be reciprocated back and forth in the intermediate portion 12 of the stalk passage 6. This movement on the part of the cross bar 51 will force the stalks which have previously been carried by the drum 14, away from the periphery of the same, and cause the said stalks to be deposited with their tops down, in the intermediate portion 12 of the stalk passage 6.

The gear rims 54 are attached to the sides of the traction wheels, 3, and mesh with the gear wheels 55, which are mounted upon the stub-shaft 56, said shafts 56 are journaled in suitable bearings 57, mounted upon the frame 1. The gear wheels 55 mesh with the gear wheels 58, which are mounted upon the shafts 59. The said shafts 59 are journaled for rotation in the bearings 60, which are also mounted upon the frame 1. Gear wheels 59' mesh with the gear wheels 61, which are mounted upon the stub shafts 62. Said shafts 62 are journaled for rotation in the bearings 63, which are mounted upon the frame 1 of the machine. The sprocket wheels 64 are also mounted upon the shafts 62, and the sprocket chains 65 pass around the sprocket wheels 64 and the sprocket wheels 42. Thus rotary movement is transmitted from the ground wheels or traction wheels 3 to the sprocket wheels 42 and the shaft 13, upon which the last said sprocket wheels are mounted. The shafts 66 are vertically disposed, and are journaled for rotation at the outer side and forward end of the portion 11 of the stalk passage 6. The beveled pinions 67 are mounted upon the said shafts 66 and mesh with the beveled pinions 68, which are mounted upon the shafts 59. The shafts 69 are journaled for rotation at the outer side of the rear portion 11 of the stalk passage 6 and carry the sprocket wheels 70. The sprocket wheels 71 are mounted upon the shafts 66. The upper sprocket chains 72 pass around the upper sprocket wheels 70 and 71 upon the said shafts, while the lower sprocket chains 73 pass around the lower sprocket wheels 70 and 71, carried by the said shafts 66 and 69. The inner runs of the said chains 72 and 73 are located within the side of the rear portion 11 of the stalk passage 5, while the outer runs of the said chains are located beyond the outer sides of the said portion 11 of the said stalk passage 6. The chains 72 and 73 are provided with the laterally disposed spaced fingers 74.

From the above description, it will be seen that the shafts 66 derive rotary movement through the intervening connecting parts with the shafts 59, and that as the said shafts 66 rotate they move the belts 72 and 73 in orbits, with the inner runs of the said chain belts traveling toward the rear end of the machine. Thus the stalks which are deposited with their tops down, in the intermediate portion 12 of the stalk passage 6 are caught up by the fingers 74 carried by the said chains, and the said stalks are moved with their butt ends uppermost toward the rear end of the machine.

The plate 75 is hingedly mounted at the forward edge portion of the rear portion 8 of the bottom of the stalk passage 6 and is held in a substantially horizontal position by means of the spring 76, which is affixed at one end to the bottom portion 8 of the stalk passage, and bears at its other end against the said plate 75.

The cutting disks 77 overlap each other and are loosely journaled at the forward edge portion of the plate 75, and have their forward peripheries located in advance of the forward edge of the said plate. The forward portions of the said disks 77 are located over the opening 9 provided between the bottom portions 7 and 8 of the stalk passage 6. Consequently, as the tops of the stalks move back along the bottom portion 7 of the stalk passage 6, they are engaged by the disks 77, which sever the tops from the body portion of the stalks, and the tops fall down through the opening 9 to the ground. The butt portions of the stalks pass back along the upper surface of the plate 75 and the bottom portion 8 of the stalk passage 6, and are eventually ejected from the rear end of the machine, shorn of the tops, as above described.

Any suitable means may be employed for advancing the machine along a row of standing stalks, and it will be understood that the row of stalks is received between the arms 36, and are straightened up by the vertical movement of the said arms, as above described. As the disks 45 come in contact with the lower portions of the stalks, the said stalks are severed from the stumps and fall against the concaved peripheral portion 15 of the drum 14. When the gripping fingers 22 arrive at the forward portion of the said drum, they are brought together, as above described, and grip the accumulated stalks, and carry the same over in a bundle, and deposit them in the intermediate portion 12 of the stalk passage 6, above described. Thus it will be seen that the stalks, after being severed from the stumps, are inverted in position, so that their tops are downwardly disposed when they are located in the intermediate portion 12 of the stalk passage 6, and that as the said stalks are carried back, the said stalks are severed from the butt portions thereof, by the disks 77. Thus the stalks are freed of objectionable foliage, and are deposited or rejected from the rear end of the machine, in proper condition to be gathered and taken to the mill.

Having described my invention, what I claim as new, and desire to secure, by Letters Patent, is:—

1. A stalk-cutter comprising stalk-severing means, stalk-straightening arms mounted for vertical movement in advance of the said stalk-severing means, and foliage-straightening wheels journaled upon the said arms.

2. A stalk-cutter comprising stalk-severing means, stalk-straightening arms mounted for vertical movement in advance of the said stalk-severing means, and foliage-straightening wheels journaled upon said arms and having radially disposed spokes.

3. A stalk-cutter comprising stalk-severing means, stalk-straightening arms mounted for vertical movement in advance of the said stalk-severing means, said arms having their forward end portions disposed away from each other, and foliage-straightening wheels carried by the said arms.

4. A stalk-cutter comprising stalk-severing means, stalk-straightening arms mounted for vertical movement in advance of the stalk-severing means and having their forward end portions disposed laterally away from each other, foliage-straightening wheels journaled upon the arms and having radially disposed spokes.

5. A stalk-cutter comprising a body having a stalk passage therethrough, a stalk-inverting means located at the forward portion of the passage, stalk-severing means located at the forward end of the passage, and top-severing means located in the passage behind the said stalk-inverting means.

6. A stalk-cutter comprising a body having a passage therethrough, a stalk-inverting means located at the forward end portion of the passage, stalk-severing means located at the forward end of the passage, top-severing means located behind the stalk-inverting means, and means for passing the stalks by the said top-severing means.

7. A stalk-cutter comprising a body having a stalk passage therethrough, stalk-severing means located at the forward end portion of the passage, stalk-straightening means mounted for vertical oscillation in advance of the passage and the said stalk-severing means, stalk-inverting means located behind the said stalk-severing means and within the said passage, and top-severing means located within the said passage and behind the said stalk-inverting means.

8. A stalk-cutter comprising a body having a stalk passage therethrough, stalk-severing means located at the forward end of the passage, stalk-inverting means located in the passage behind the said stalk-severing means, and having gripping fingers mounted thereon, and top-severing means located within the passage behind the said stalk-inverting means.

9. A stalk-cutter comprising a body having a stalk passage therein, said passage having its end portions relatively constricted, with an enlarged intermediate portion, stalk-severing means located at the forward end of the said passage, and stalk-inverting means located between the said stalk-cutter and the intermediate enlarged portion of the said stalk passage, and top-severing means located in the rear portion of the said stalk passage.

10. A stalk-cutter comprising a body having a stalk passage therein, said stalk passage having relatively constricted end portions with a relatively large intermediate portion, stalk severing means located at the forward end of the said passage, stalk-straightening arms mounted for oscillation in advance of the said stalk-severing means, a stalk-inverting means located in the forward portion of the said passage and entering the enlarged portion of the passage, and top-severing means located in the rear portion of the said stalk passage.

11. A stalk-cutter comprising a body having a stalk passage therein, said passage having relatively constricted end portions with an enlarged intermediate portion, stalk-severing means located at the forward end of the passage, stalk-straightening arms mounted for oscillation in advance of the said stalk-severing means, a stalk-inverting means located in the forward portion of the passage, and having grippers thereon, and top-severing means located in the rear portion of the passage.

12. A stalk-cutter comprising a body having a stalk passage therein, stalk-severing means located at the forward portion of the passage, stalk-straightening arms mounted for oscillation in advance of the said stalk-severing means, a stalk-inverting means located in the forward portion of the passage a stalk advancing bar mounted for movement longitudinally along the intermediate portion of the said passage, and endless conveyers mounted for orbital movement along the rear portion of the passage.

13. A stalk-cutter comprising a body having a stalk passage therein, said passage having relatively constricted end portions with an enlarged intermediate portion, a stalk-severing means mounted at the forward end of the passage, stalk-straightening arms mounted for oscillation in advance of the said stalk-severing means, stalk-inverting means located in the forward portion of the passage, a stalk-advancing cross-bar mounted for movement longitudinally along the intermediate portion of the said stalk-passage, top-severing means located in the rear portion of the passage, and conveyer chains mounted for orbital movement along the rear portion of the said stalk-passage.

14. A stalk-cutter comprising a body having a stalk passage therein, said passage having relatively constricted end portions with an enlarged intermediate portion, stalk-severing means located at the forward end of the passage, stalk-straightening arms mounted for oscillation in advance of the stalk-severing means, a stalk-inverting drum journaled for rotation at the forward portion of the passage and having a concaved periphery, stalk grippers carried by the said drum, a stalk-advancing bar mounted for longitudinal reciprocation along the intermediate portion of the said passage and having an arcuate intermediate portion, impaling teeth mounted upon the said stalk-advancing bar, top-severing means located at the rear portion of the said stalk passage, and endless conveyer belts mounted for orbital movement at the rear portion of the said stalk passage.

In testimony that I claim the foregoing as my own, I have hereto affixed my signature in the presence of two witnesses.

MEDERIC C. MOLLERE.

Witnesses:
CLIFTON C. LATHROP,
ELIE LUIDRY.